Aug. 24, 1965

O. T. ADLHART ETAL 3,202,548

RESERVE TYPE ELECTROCHEMICAL BATTERY

Original Filed Nov. 3, 1960

INVENTORS,
OTTO T. ADLHART &
HOWARD R. KNAPP.
BY Jack H. Linscott

ATTORNEY.

United States Patent Office 3,202,548
Patented Aug. 24, 1965

3,202,548
RESERVE TYPE ELECTROCHEMICAL BATTERY
Otto T. Adlhart, Orange, and Howard R. Knapp, Red Bank, N.J., assignors to the United States of America as represented by the Secretary of the Army
Continuation of application Ser. No. 67,145, Nov. 3, 1960. This application Aug. 30, 1962, Ser. No. 220,972
1 Claim. (Cl. 136—90)

This application is a continuation of the application of Otto Adlhart and Howard R. Knapp, Serial Number 67,145, filed Nov. 3, 1960, now abandoned, for Reserve Type Electrochemical Battery.

The invention described herein may be manufactured and used by or for the Government for governmental purposes, without the payment of any royalty thereon.

This invention relates to an improved electrochemical battery utilizing a liquid anhydrous ammonia electrolyte, and more particularly, to a reserve type electrochemical battery that can be activated by a liquid anhydrous ammonia electrolyte.

The objective of this invention is to provide a reserve type electrochemical battery that can be activated and then operate in a very short time at temperatures from about $-60°$ C. to $70°$ C.

The principle of reserve type operation offers, as is widely recognized, the advantage of almost unlimited battery shelf life. It is based on the concept that electrolyte and cell compartments are separated up to the moment when the battery is actually used. The design of a reserve type battery as well as the activation device may vary widely. In most cases, however, the electrolyte is kept in a container which may have a tubular shape and is separated from the cell compartments by a diaphragm. At the moment of activation, the diaphragm is burst by the pressure developed from the firing of a squib located in the electrolyte container and the electrolyte is forced into the battery. Many other techniques have also been used successfully to bring the electrolyte into the cell compartments.

These techniques have generally given satisfactory results at normal and warm temperatures. At low temperatures, however, appreciable difficulties occur. These difficulties can be attributed to the fact that conventional battery systems have to be heated in order to be operable at low temperatures. In reserve type batteries, this is done by electrical heating coils that surround the battery. It also is achieved in many cases by chemical heating devices either located on the battery plates or in the electrolyte container. On the activation of such a battery at low temperatures, considerable delay cannot be prevented before the battery is operable. This is due to the time needed for the heat transfer and the temperature control that has to be provided in order to avoid overheating of the battery. The delay between activation and actual operation of the battery may be as long as 30 minutes. Only under very favorable circumstances can it be reduced to 3–4 seconds at a temperature of $-40°$ C. This, however, is insufficient since in many applications activation has to be completed in less than a second.

We now find that the difficulties of low temperature activation can be overcome by using a liquid anhydrous ammonia electrolyte and a type of battery cell construction as will be described hereinafter. That is, with this type electrolyte and battery cell construction, a reserve type electrochemical battery can be activated without heating devices in less than a second at temperatures as low as $-70°$ C. This, of course, enables our system to be used in many military as well as commercial applications where electronic equipment has to be brought in operation instantly.

In preparing the liquid anhydrous ammonia electrolyte, a salt ionizable in liquid anhydrous ammonia is dissolved therein. Any salt can be used regardless of the neutral, acid or alkaline character which it imparts to the solution. Examples of salts of general applicability are the thiocyanates, perchlorates, fluoborates, cyanates, nitrates, nitrites, and the like. The salt may be present in the amount of about 15% to 45% by weight of the total solution. The use of potassium thiocyanate as the salt of the liquid anhydrous ammonia electrolyte is preferred in the electrochemical batteries.

In the case of the reserve type battery the preformed liquid electrolyte is placed in an electrolyte container which is inert to the ammonia solution. Aluminum, stainless steel, iron and even plastics are among the materials that can be used for this purpose.

The cell compartment of the reserve type rapid activating ammonia battery employs sheet anodes, pasted cathodes and a plastic spacer for electrode separation. The plastic spacer is particularly important in high rate batteries where high current densities are drawn from the cell at the moment of activation. This spacer allows fast penetration of the electrolyte solution throughout the cell. The spacer can have various shapes. That is, it can be a corrugated and perforated plastic sheet for example, or a screen of plastic bars with wide openings in order to provide free flow of the electrolyte and minimum internal cell resistance. Such a spacer provides for the maintenance of maximum free volume between the anode and the cathode of the cell compartment, and also provides for minimum contacting surfaces between the faces of the anode plate and separator and between the faces of the cathode plate and separator. The maximum free volume is essential to allow for expansion of the anode and cathode plates due to formation of cell reaction products formed by initial reaction with the electrolyte or through cell discharge, to provide minimum cell resistance, and to provide maximum ionic mobility in the electrolyte. In low rate reserve type batteries and non-reserve electrochemical batteries, a cell construction without plastic spacers is usable since the initial current densities are not as great. Simple separation of the electrodes by several layers of paper is then sufficient.

Essentially, the reserve type rapid activating ammonia battery cell compartment will consist of a three-plate sandwich design with the cathode in the center, a separator or spacer on either side of the cathode and a thin metal anode placed against the outside of each separator. The anode can be an electropositive metal; in general, a metal above iron in the electrochemical series, particularly lithium, sodium, potassium, caesium, zinc, aluminum or beryllium. The use of magnesium as the anodic material is preferred. The cathode consists of a flat plate design in which a depolarizing compound is thoroughly mixed with non-reactive conductive material such as graphite or carbon black to provide adequate conductivity to the plate. An organic binder dissolved in toluene is added and the mixture pasted on both sides of an expanded metallic grid structure. The cathode is then placed in a porous paper envelope such as Aldex paper to prevent mechanical flaking of the cathode material from interfering with the electrochemical action of the cell. The use of a heavy metal sulfate such as the sulfates of lead or mercury as the depolarizing compound is preferred. Then too, the material of the metallic grid structure must be non-reactive with the liquid ammonia electrolyte. Materials such as titanium, silver, aluminum, or stainless steel serve the purpose well.

The principle of reserve type operation utilizing liquid anhydrous ammonia electrolyte can perhaps be best seen by referring to the drawings.

Figure 1:
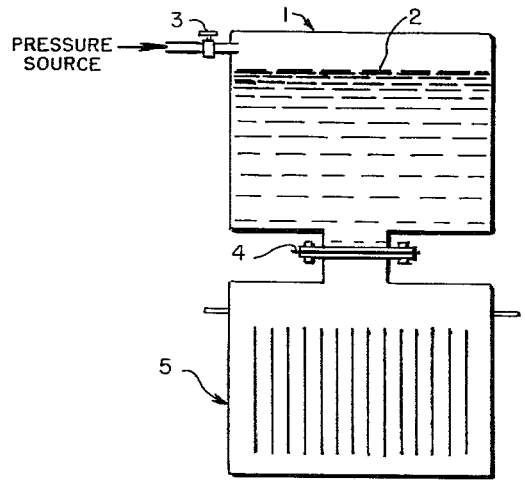
FIG. 1 is a schematic or diagrammatic view showing a container holding liquid anhydrous ammonia electrolyte, cell compartments of a reserve type electrochemical battery separated from the container by a diaphragm, and means for rupturing the diaphragm.

Referring to FIG. 1 of the drawing, the preformed liquid ammonia electrolyte 2 is placed in the electrolyte container. At the desired time of activation, application of pressure from the pressure source 3 causes rupture of the diaphragm 4 whereby the electrolyte flows into the cell compartments of the reverve type electrochemical battery 5.

Figure 2:
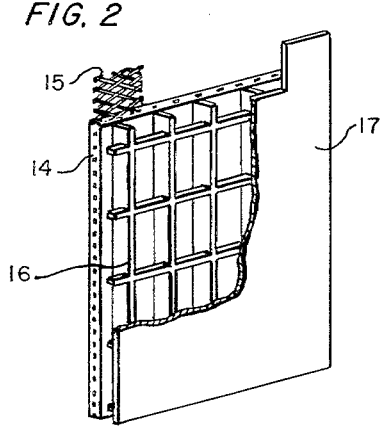
FIG. 2 is a cut away view of a 2 plate cell compartment of a reserve type electrochemical battery for rapid rate activation.

Referring to FIG. 2 of the drawing, the cathode 14 consists of a flat plate design pasted on both sides of an expanded grid structure 15. The screen of plastic bars with wide openings 16 separates the cathode from the thin sheet anode 17.

Figure 3:
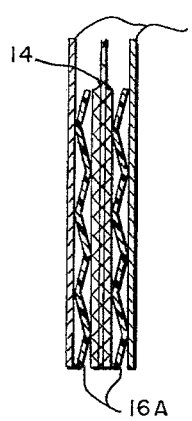
FIG. 3 is a cross-sectional view of a 3 plate cell compartment of a reserve type electrochemical battery for rapid rate activation.

In FIG. 3 of the drawing, a corrugated and perforated plastic sheet spacer 16A separates the thin sheet anodes 17 from the cathode 14.

Figure 4:
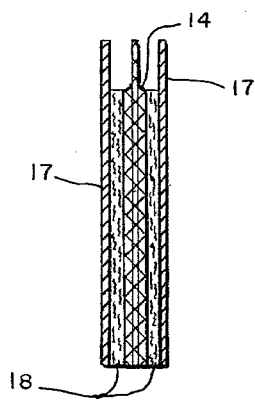
FIG. 4 is a cross-sectional view of a 3 plate cell compartment of a reserve type electrochemical battery for low rate activation.

In FIG. 4 of the drawing, a pad from several layers of filter paper impregnated with electrolyte salt 18 separates the sheet anodes 17 from the cathode 14.

In both the rapid rate and low rate activation systems shown, the use of the liquid anhydrous ammonia electrolyte assures low temperature operation without auxiliary heat, and the cell structure design allows immediate contact of the electrolyte with all cell components. Significantly, it has been found that activation with liquid ammonia electrolyte assures more complete and rapid activation of the cell than activation by ammonia vapor. That is, at low temperatures, activation by ammonia vapor was incomplete because part of the electrolyte pad was left dry and moreover, resulted in uncontrollable formation of highly concentrated salt solutions that caused immediate anode polarization. Complete activation with liquid ammonia electrolyte can be obtained at any temperature of battery operation.

In deciding upon a suitable ammonia system for rapid rate and low rate activation many factors have to be considered as influencing the performance. These includes the chemical properties of the electrolyte solution, the conductivity of the electrolyte, and the corrosion, solubility, potential, and current carrying ability of the anode and cathode materials. Among the anode materials usable in ammonia systems, magnesium is especially preferred because it is not soluble in liquid ammonia. When using magnesium as the anode, certain electrolytes and cathodic materials are found to be preferable to others.

As far as the electrolytes are concerned, magnesium salts generally form poor conductive electrolyte solutions in anhydrous ammonia. If systems with this electrolyte are discharged at a high current density, a great drop in cell voltage is unavoidable because of the high resistivity of the electrolyte. Consequently, the energy output of the system is drastically reduced. The use of ammonium salt solutions present another problem. That is, the ammonium salts form acid solutions in anhydrous ammonia. Highly active materials such as magnesium therefore are rapidly dissolved in these solutions with the formation of hydrogen and dissolution of the anode. Due to this rapid corrosion, ammonium salt electrolytes cannot be used in low rate systems with magnesium anodes. At high rates, a limited use is possible. However, even there, a high loss in capacity cannot be avoided. Best results are obtained using an electrolyte salt that forms neutral solutions in liquid ammonia. The alkali metal salts work well in this connection and particularly desirable results are obtained with potassium thiocyanate. That is, use of these electrolytes in systems with magnesium anodes results in a large reduction in the internal voltage drop and elimination of the corrosion of the anode and consequently gassing and loss in capacity. In fact, the voltage drop is reduced to about ⅓ that observed with magnesium salt electrolyte and the magnesium anode is found to be completely stable over long periods of time in alkali metal solutions.

As concerns the cathode material to be used when magnesium is the anode, the use of inorganic oxides and heavy metal chlorides or thiocyanates cause serious problems. Oxides will generally give satisfying service only in acid ammonia solutions. As stated previously, however, these solutions are entirely unsuited for magnesium anodes because of rapid chemical corrosion. The heavy metal chlorides and thiocyanates are not desired because of their solubility in ammonia electrolyte solutions. Heavy metal ions travel to the anode and react directly with the magnesium which results in loss in cell capacity and polarization of the anodes. Because of this reaction for example, the use of mercuric chloride at room temperature as a cathodic material will only be utilized by about 17% for the desired electrochemical reaction. The remaining material will be lost in a direct chemical reaction with the anode. The adverse effects of oxides, thiocyanates and chlorides can be avoided by using heavy metal sulfates for depolarization. Mercuric sulfate and lead sulfate work particularly well, that is, they are appreciably less soluble than the previously mentioned thiocyanates and chlorides. Because of this lower solubility, self discharge is greatly reduced in systems with magnesium anodes. With mercuric sulfate for instance, up to 90% of the active material is utilized for the desired electrochemical reaction compared to 17% with the mercuric chloride. Consequently, the energy output of systems with magnesium anodes is significantly increased. Another advantage of heavy metal sulfates is their operability in neutral ammonia solutions where heavy metal oxides are not suitable. These solutions are as previously stated highly suitable for magnesium anodes and contribute toward good utilization of the cell capacity at low as well as high discharge rates.

The following examples illustrate cell systems of the reserve type electrochemical battery.

*Example 1.*—The anode is made of a thin sheet of magnesium which is pickled with acid and polished with steelwool. The cathode consists of a mixture of 70% mercuric sulfate and 30% graphite pasted with the addition of a small amount of organic binder on a silver, titanium, tantalum or stainless steel grid. As electrolyte, a 15% to 45% solution of potassium thiocyanate in liquid anhydrous ammonia is used. The use of a 35% solution is preferred.

The cell is made of one cathode and one anode as illustrated by FIG. 2 of the drawing. They are separated by a plastic spacer approximately 0.04 inch thick. This barrier allows free flow of the electrolyte. To increase mechanical stability of the cell and improve separation of negative and positive material, the cathode is wrapped in one or more layers of thin porous paper.

For discharge at low temperatures the cell is immersed in the electrolyte, or the electrolyte is poured into the cell. At higher temperatures, the electrolyte is brought into contact with other cell components under pressure. At −60° C. a load voltage of 1.9–2.0 volts is obtained at a current density of 1 ampere per square inch. The cell produces current for at least 6 minutes with a cell voltage higher than 1.75 volts. At 70° C., where the cell has to be discharged under pressure, a voltage of 2.0–2.1 is observed at 1 ampere per square inch. Again, the service is at least 6 minutes to 10% drop from maximum voltage. At both temperatures, the utilization of the cathode material at the above-mentioned rate is in the order of 65–85% of the theoretical value of 2 Faradays per mole. The utilization of the anode material approaches 100% of theoretical value. The energy output of the cell is approximately 20–30 watt hours per pound and 1.5–2.0 watt hours per cubic inch.

*Example 2.*—In this example, the same anode and cathode material and electrolyte are used as in Example 1. The cell, however, is made of three plates, one cathode and 2 anodes as illustrated by FIG. 3 of the drawing. The cathode is placed in the center of the cell and on each side is placed a plastic separator and the anode. Anode and cathode plates as well as electrode spacing and separation are identical with Example 1.

The cell is discharged at a current density of 0.2 amperes per square inch of apparent cathode surface. The load voltage is 2.3 volts at the beginning of discharge. It drops to approximately 2.07 volts after 20–25 minutes discharge.

At 70° C., almost the same length of service is obtained at a voltage level only 2–3% higher than at −60° C. Utilization of the active cathode material is in the order of 70–85%.

*Example 3.*—In this example, magnesium is the anode, a 35% by weight solution of potassium thiocyanate in anhydrous ammonia the electrolyte and lead sulfate is the cathode material. The cell structure is identical to that in Example 1. That is, magnesium sheet anodes, plastic spacers, and thin paper separators are employed.

The cathode is prepared of pure lead sulfate powder or a mixture of lead sulfate and graphite. This material is pasted with the addition of some organic binder on similar metal grids as in Example 1.

At −60° C., a two-plate cell can be discharged at a current density of 1 ampere per square inch. At least 4 minutes of service is obtained at a load voltage starting at 1.5 volts at the beginning of the discharge to 1.3 volts at the end of discharge. The utilization of the active positive material is at least 50% of the theoretical value of two Faraday's per mole.

*Example 4.*—This example illustrates a low rate discharge of a system utilizing a magnesium anode, a solution of potassium thiocyanate in anhydrous ammonia as the electrolyte, and mercuric sulfate as the cathode. The cathode consists of a mixture of 10% graphite and 90% mercuric sulfate pasted on a silver, titanium, tantalum or stainless steel screen.

Negative and positive plates are separated by one or several layers of filter paper impregnated with potassium thiocyanate as illustrated by FIG. 4 of the drawing. The concentration of potassium thiocyanate in the pads can be varied widely. Any amount of salt which can produce electrolyte having a salt concentration between 5–60% by weight can be used. For discharge, the cell is immersed in pure ammonia. At −60° C. the electromotive force of the cell is approximately 2.38 volts. It will rise to 2.45 volts at 70° C. The cell is discharged at 10 milliamperes per square inch. At least 10 hours of service are obtained at a load voltage above two volts.

It will be obvious to those skilled in the art that various changes and modifications may be made therein without departing from the invention as herein claimed.

What is claimed is:

A reserve type electrochemical battery that can be activated without heating devices in less than one second at temperatures of −70° C., said battery including a container holding a liquid anhydrous ammonia solution of potassium thiocyanate therein, a cell compartment separated from the container by a diaphragm, means for rupturing said diaphragm so that the liquid anhydrous ammonia solution of potassium thiocyanate can enter said cell compartment, and where said cell compartment comprises a magnesium anode and a cathode including an expanded metallic grid structure having a mixture pasted on both sides thereof and wherein said mixture is of a depolarizing compound selected from the group consisting of mercuric sulfate and lead sulfate thoroughly mixed with non-reactive conductive material selected from the group consisting of graphite and carbon black to which organic binder is added, and where the electrodes are separated by a plastic spacer.

References Cited by the Examiner

UNITED STATES PATENTS

| | | | |
|---|---|---|---|
| 2,783,291 | 2/57 | Gold | 136—90 |
| 2,814,664 | 11/57 | Ruben | 136—119 |
| 2,863,933 | 12/58 | Minnick et al. | 136—6 |
| 2,930,829 | 3/60 | Jacquier | 136—143 |
| 2,937,219 | 5/60 | Minnick et al. | 136—6 |
| 3,083,252 | 3/63 | Meyers | 136—153 X |

WINSTON A. DOUGLAS, *Primary Examiner.*

MURRAY TILLMAN, JOHN A. MACK, *Examiners.*